(12) United States Patent
Heelan et al.

(10) Patent No.: US 8,228,208 B2
(45) Date of Patent: Jul. 24, 2012

(54) COMMUNICATION SYSTEM FOR SURVEY SOURCE AND RECEIVER

(75) Inventors: Philip Heelan, Asker (NO); Leendert Combee, Sandvika (NO)

(73) Assignee: WesternGeco L.L.C., Houston, TX (US)

( * ) Notice: Subject to any disclaimer, the term of this patent is extended or adjusted under 35 U.S.C. 154(b) by 1010 days.

(21) Appl. No.: 12/181,146

(22) Filed: Jul. 28, 2008

(65) Prior Publication Data
US 2010/0019929 A1    Jan. 28, 2010

(51) Int. Cl.
*G01V 3/12*    (2006.01)

(52) U.S. Cl. ........... 340/853.2; 340/853.3; 324/365

(58) Field of Classification Search ......... 340/853.2, 340/853.3; 367/56, 58, 59, 77; 324/365
See application file for complete search history.

(56) References Cited

U.S. PATENT DOCUMENTS

| | | | |
|---|---|---|---|
| 4,617,518 A | 10/1986 | Srnka | |
| 6,236,211 B1 | 5/2001 | Wynn | |
| 6,714,761 B1 | 3/2004 | Anderson, III | |
| 6,900,639 B2 | 5/2005 | Ellingsrud et al. | |
| 6,912,465 B2 | 6/2005 | Collins et al. | |
| 7,002,350 B1 | 2/2006 | Barringer | |
| 7,203,599 B1 | 4/2007 | Strack et al. | |
| 7,612,686 B1* | 11/2009 | Bustamante et al. | 340/850 |
| 2006/0001428 A1* | 1/2006 | Milne et al. | 324/360 |
| 2006/0091889 A1 | 5/2006 | Ellingsrud et al. | |
| 2007/0043507 A1* | 2/2007 | Tobaru | 701/301 |
| 2007/0286022 A1 | 12/2007 | Bull et al. | |
| 2010/0116550 A1* | 5/2010 | Hutin et al. | 175/40 |

FOREIGN PATENT DOCUMENTS

| | | |
|---|---|---|
| WO | 8301839 A1 | 5/1983 |
| WO | 03079049 A2 | 9/2003 |
| WO | 2005006022 A1 | 1/2005 |

OTHER PUBLICATIONS

Thompson, et al., Marine Geophysical Prospecting System, United States Statutory Invention Registration, Published Sep. 5, 1995, Registration No. H1490.
PCT Search Report, dated Feb. 8, 2010, Application No. PCT/US2009/050789.

* cited by examiner

*Primary Examiner* — Giovanna Wright

(57) ABSTRACT

A method for communicating with a receiver during an electromagnetic survey. In one implementation, the method may include sending a survey signal to a subsurface region, wherein the survey signals is a first electromagnetic signal and sending a diagnostic signal to the receiver. The diagnostic signal is a second electromagnetic signal having a diagnostic message.

25 Claims, 5 Drawing Sheets

COMMUNICATION SYSTEM FOR SURVEY SOURCE AND RECEIVER

BACKGROUND

1. Field of the Invention

Implementations of various technologies described herein generally relate to methods and systems for electromagnetic communication for survey diagnostics.

2. Description of the Related Art

The following descriptions and examples are not admitted to be prior art by virtue of their inclusion within this section.

In recent years, electromagnetic surveying has been used for surveying subterranean hydrocarbon reservoirs. Typically, a number of electromagnetic sensors (receivers) are placed on a subsurface area along a tow line. A transmitter is then towed over the receivers, and the receivers record the resultant electromagnetic signal. Electric field and magnetic field information are then recorded across several data channels. An image of the subsurface area may then be generated based on the recorded signals.

SUMMARY

Described herein are implementations of various technologies for a method for communicating with a receiver during an electromagnetic survey. In one implementation, the method may include sending a survey signal to a subsurface region, wherein the survey signals is a first electromagnetic signal and sending a diagnostic signal to the receiver. The diagnostic signal is a second electromagnetic signal having a diagnostic message.

Described herein are also implementations of various technologies for a method for communicating with a source to be used in an electromagnetic survey. In one implementation, the method may include recording a measurement of an electromagnetic field strength radiating from the subsurface in response to a survey signal sent from the source and receiving a diagnostic signal from the source to be used in the electromagnetic survey. The diagnostic signal is an electromagnetic signal having a diagnostic message.

Described herein are also implementations of various technologies for a communication system for an electromagnetic survey. In one implementation, the system may include a source configured to: send a survey signal to a subsurface region and send a diagnostic signal to a receiver having a time that the survey signal is sent. The receiver may be configured to: record a measurement of an electromagnetic field strength radiating from the subsurface region in response to the survey signal and receive the diagnostic signal.

Described herein are also implementations of various technologies for a method for processing electromagnetic survey data. In one implementation, the method may include determining an approach time when a source approaches a receiver, determining a drift algorithm based on the approach time, a start time when the receiver is deployed, a first clock cycle associated with the start time, and a second clock cycle associated with the approach time, and processing the electromagnetic survey data based on the drift algorithm.

In another implementation, the method for processing electromagnetic survey data may include determining a first plurality of approach times when a source approaches a receiver during a first plurality of survey lines, determining a first drift algorithm based on: the first plurality of approach times and a first plurality of survey clock cycles respectively associated with the first plurality of approach times. The first drift algorithm reflects a first drift behavior during the first plurality of survey lines. The method may further include processing the electromagnetic survey data based on the first drift algorithm.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1A:
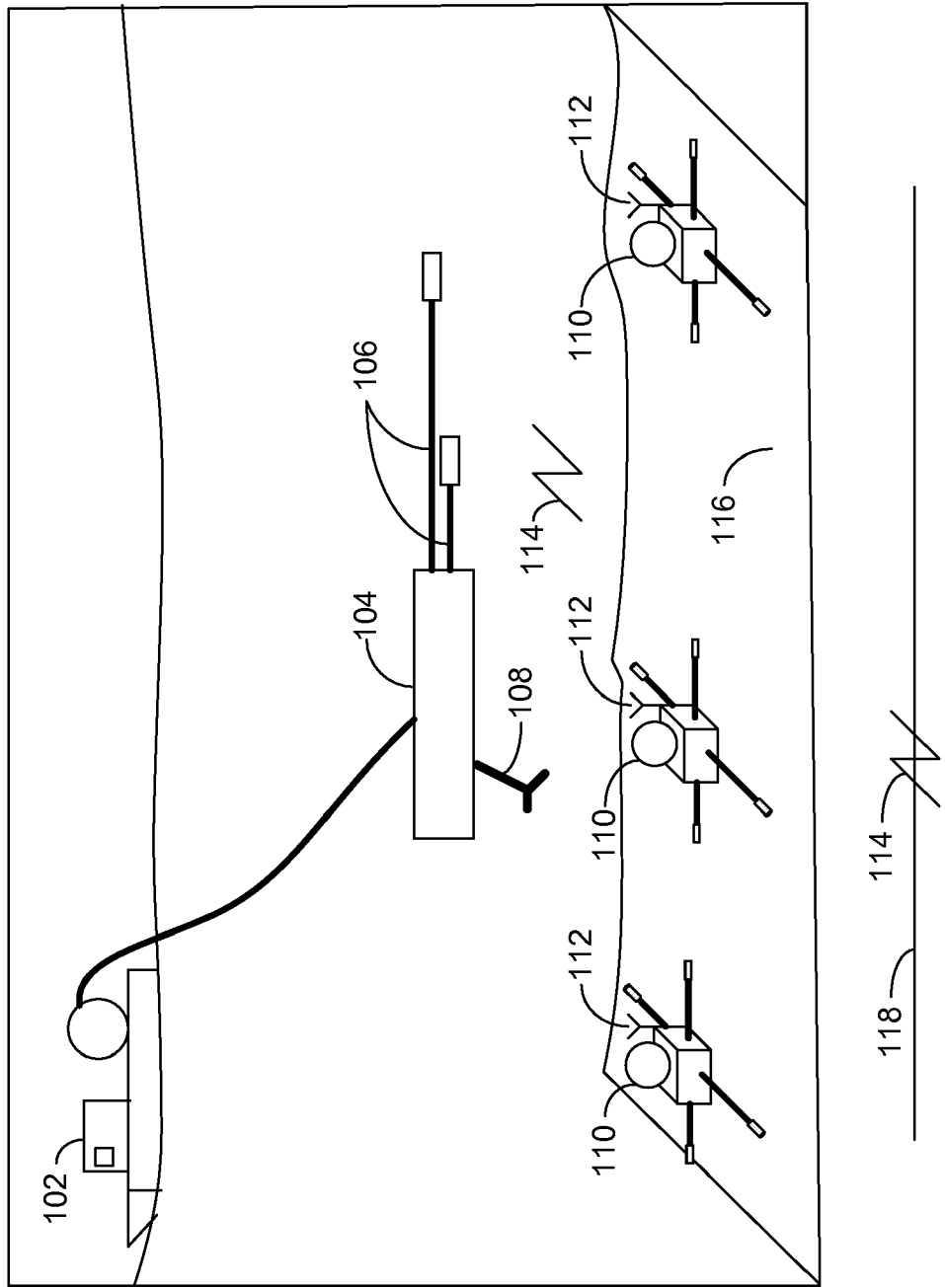
FIG. 1A illustrates a marine electromagnetic survey in accordance with implementations of various technologies described herein.

FIG. 1A illustrates a marine electromagnetic survey system 100 in accordance with implementations of various technologies described herein. Marine electromagnetic surveying is normally performed by a survey vessel 102 that moves in a predetermined pattern along the surface of a body of water such as a lake, a sea, or the ocean. The survey vessel 102 is configured to pull a towfish (source) 104, which is connected to a survey antenna 106. In one implementation, the survey antenna 106 is a dipole antenna comprising two electrodes separated by a particular distance. The source 104 may also include a communication antenna 108 for communicating with the receivers 110.

At the source 104, a controlled electric current may be generated and sent through the survey antenna 106 into the seawater. In one implementation, the electric current generated is in the range of about 0.1 Hz and about 10 Hz. The current creates an electromagnetic field 114 in the subsurface region 118 to be surveyed.

Receivers 110 may be positioned on the seabed 116 at predetermined locations. In one implementation, the receivers 110 may be electromagnetic field sensors that take measurements of the electromagnetic field 114 created in the subsurface region 118.

The receivers 110 may include measurement transducers (not shown) capable of measuring electric field strength (electrodes) and magnetic field strength (coils). The receivers 110 may measure the electromagnetic field 114 during the surveying period. In one implementation, the receivers 110 may each have a communication antenna 112 for communicating with the source 104.

Typically, the receivers 110 may be placed on the seabed 116 for a period of several weeks before being used in a survey. As such, it may be advantageous to determine whether the receivers 110 are functioning properly before a survey is conducted. The source 104 may send a communication signal to the receiver 110 that includes a diagnostic message. In one implementation, the communication signal may be an electromagnetic signal. The communication signal may be transmitted over a range from about 10 Hz to about 100 Hz. The communication signal may also be transmitted over other ranges, such as 100 Hz to 500 Hz and the like. In this manner, this frequency range may be significantly different from the range of frequency for the electric current generated by the source 104. The communication signal may be sent during a survey.

The diagnostic message may be a request for the receiver 110 to determine whether the receiver 110 is active. In response to receiving the diagnostic message, the receiver 110 may send a signal to the source 104 that indicates the status of the receiver 110. In one implementation, the diagnostic message may be a request for the receiver 110 to indicate data channels on the receiver 110 that are (or are not) available for the survey. The operation of the receivers 110 will be described in greater detail in the description for FIG. 2.

Figure 1B:
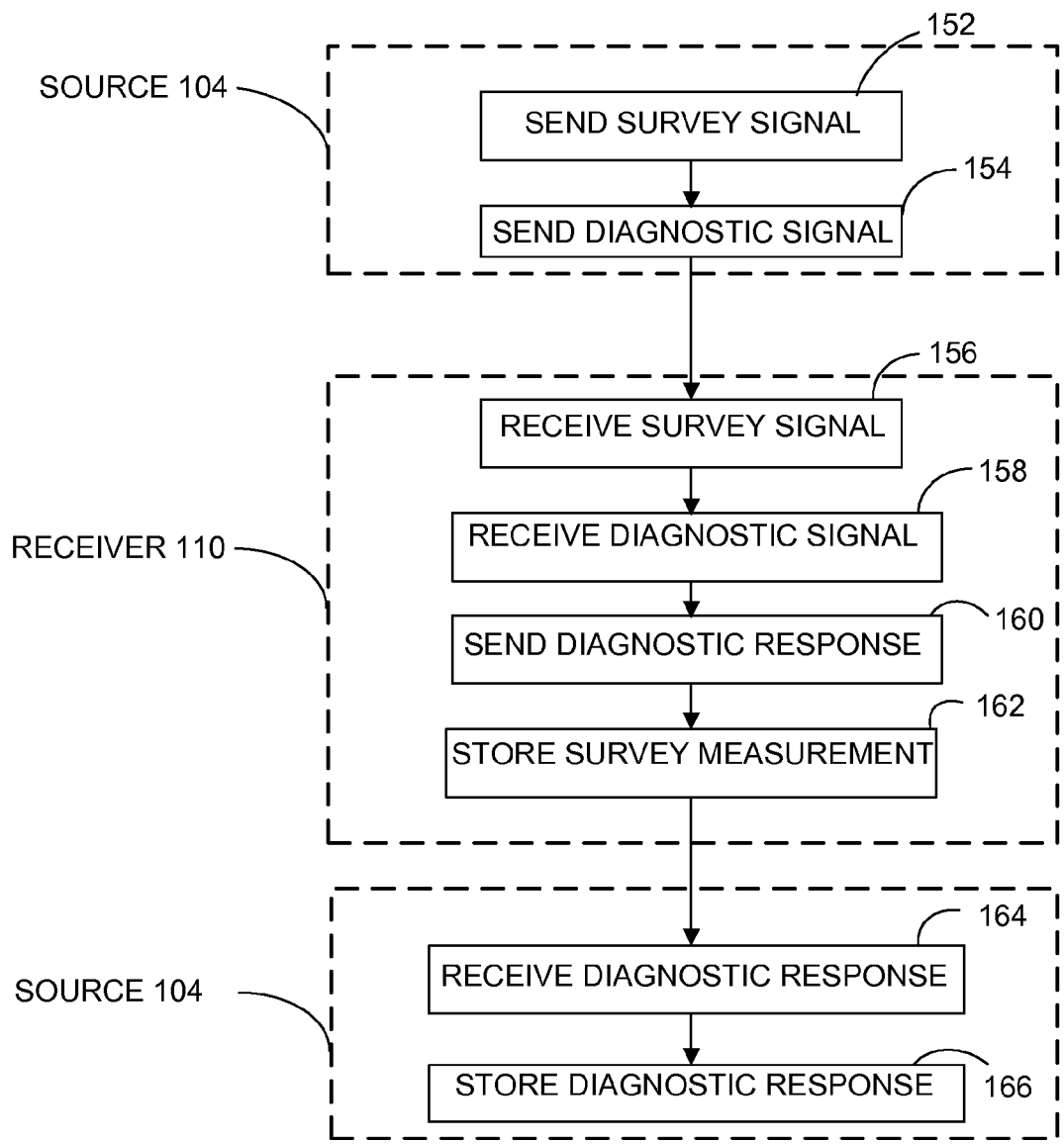
FIG. 1B illustrates a flow diagram for communications between a source and receiver, in accordance with implementations of various technologies described herein.

FIG. 1B illustrates a flow diagram of communications between the source 104 and the receivers 110 in accordance with implementations of various technologies described herein.

At step 152, the source 104 may send a survey signal to the subsurface region 118. In one implementation, the source 104 may send an electromagnetic current into the seawater via the electrodes on the survey antenna 106.

At step 154, the source 104 may send a diagnostic signal to the receiver 110. The diagnostic signal may be a communications signal that includes a diagnostic message. For example, the diagnostic message may be a request for the status of the receiver, e.g., active or inactive. In one implementation, the communication signal may be sent concurrently with the survey signal sent at step 152. The source may send the communication signal via the communication antenna 108.

At step 156, the receiver 110 may receive the survey signal from the source 104. The survey signal may pass through, or reflect off of, the subsurface region 118 before being received. At step 158, the receiver 110 may receive the diagnostic signal from the source 104.

At step 160, the receiver 110 may send a response signal to the source 104. The response signal may be a communication signal sent to the source 104 in response to the received diagnostic signal. For example, the receiver 110 may send a communication signal to the source 104 that includes the status of the receiver 110, e.g., active or inactive.

At step 162, the receiver 110 may store a survey measurement in response to the survey signal. The survey measurement may include a measurement of an electromagnetic field strength radiating from the subsurface in response to the survey signal. The survey measurement may be then stored in storage 214.

In one implementation, the diagnostic message may include a time that the survey signal is sent from the source. As such, the receiver 110 may associate the time with the electromagnetic field strength measurement. The receiver 110 may also associate the time with a clock cycle of the receiver 110. The clock cycle corresponds to the sequence of the electromagnetic field strength measurement.

At step 164, the source 104 may receive the response signal from the receiver 110 that includes the status, and at step 166, store the response signal for later use in processing the survey data stored on the receiver 110. Implementations of the receiver 110 are described in greater detail in the description of FIG. 2. In one implementation, the diagnostic response may be stored remotely instead of locally on the source 104.

Figure 2:
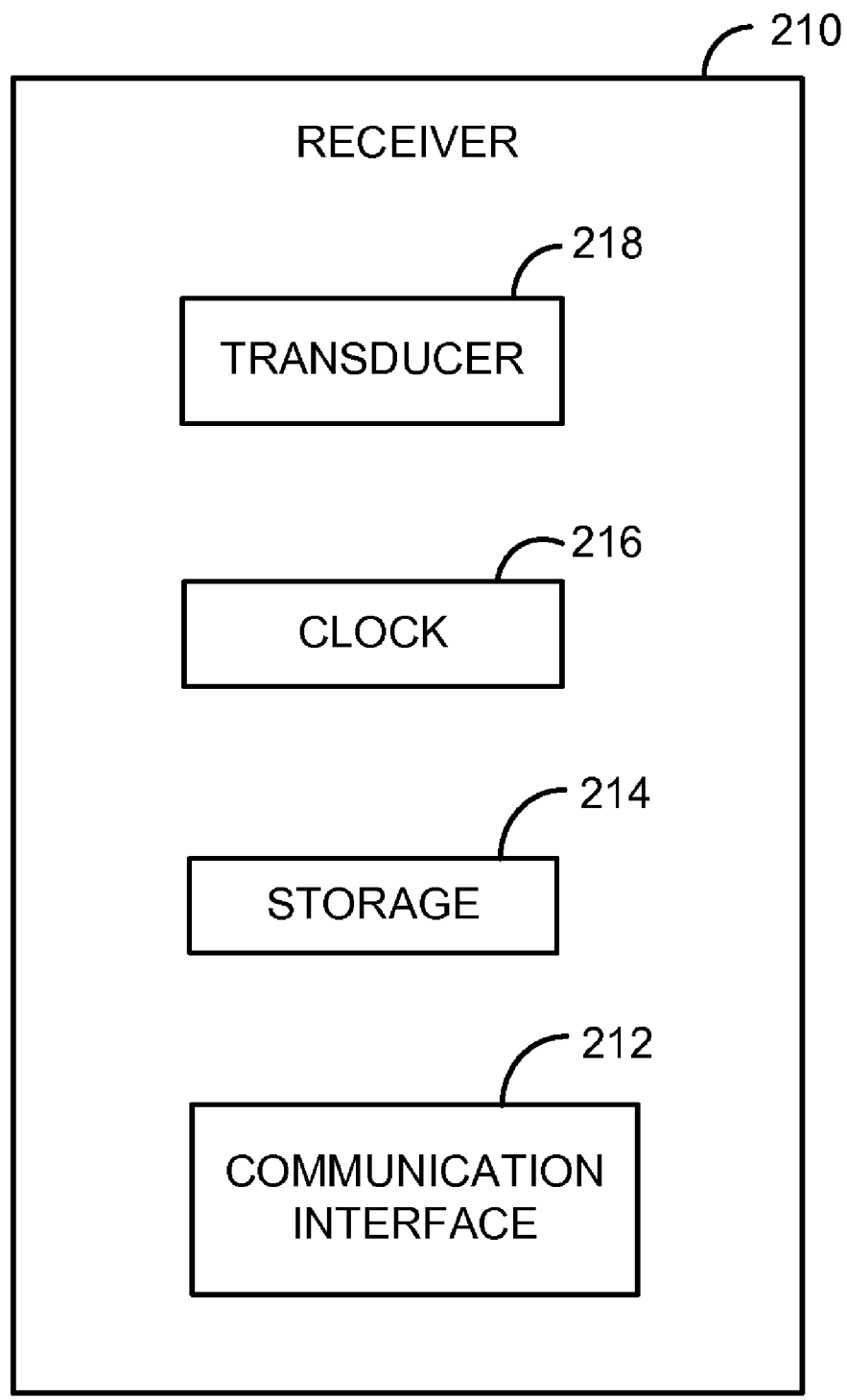
FIG. 2 illustrates a receiver in accordance with implementations of various technologies described herein.

FIG. 2 illustrates a receiver 210 in accordance with implementations of various technologies described herein. The receiver 210 may include a communication interface 212, a storage 214, a clock 216, and a transducer 218. The communication interface 212 may be configured to facilitate communication with the source 104. In one implementation, the communication interface 212 may be configured for EM communications in Gaussian minimum shift keying (GMSK) frequencies.

The storage 214 may be any computer-readable media that may be written to and accessed by a computer such as random access memory (RAM). Typically, when the receiver 210 is deployed and recovered, start and end times may be recorded in the storage 214 for use in processing the survey data. A fixed reference time may be used, such as a global positioning system (GPS) time.

The transducer 218 may be a device that detects electromagnetic signals and sends a measurement of the signals to the storage 214.

The clock 216 may be a simple processor that directs the transducer 218 to store a measurement of survey signal strength at a pre-programmed rate. For example, the clock 216 may direct the transducer 218 to store the measured survey signal strength in the storage 214 twenty times per second.

The clock cycle may also be stored in association with the signal measurement. By tracking the clock cycle at which a particular measurement is recorded, it is possible to determine the time when the measurement is recorded. For example, if the start time stored in storage 214 is 12:00:00 A.M., and the clock rate is twenty cycles per second, then the $20^{th}$ clock cycle takes place at 12:00:01 A.M. (1 second after the start time), and the $1,200^{th}$ cycle takes place at 12:01:00 A.M. (60 seconds/1 minute after the start time). The timing of the measurements may be used in processing the signal data to determine details about the subsurface region 118.

However, over an extended period of time typical of receiver deployments, the clock 216 may experience drift. Drift may be defined as a change in the clock cycle rate that occurs over time due to factors such as temperature, mechanical or software imperfections, or atmospheric pressure. For example, over the course of a three to six week deployment, the clock 216 pre-programmed to twenty cycles per second may drift by two to four cycles. As such, instead of the $12,000,000^{th}$ cycle taking place at an expected time, the $12,000,002^{nd}$ cycle takes place at that time because of a drift of two cycles.

As a result, determining the time based on the clock cycle may require accounting for the drift. By periodically storing the time in the receiver's storage, it may be possible to account for drift during the receiver's deployment. In one implementation, the communication interface 212 may receive a diagnostic signal with a message that includes the time, e.g., GPS time, when the survey signal is sent. In such a scenario, the clock 216 may also store the time and associate the time with the current clock cycle. It should be noted that GPS time is merely used as an example of a fixed time standard that can be relied upon for consistency when processing the survey data. Other time sources could be used in the implementations described herein, such as the U.S. Atomic Clock.

While in this example the communication interface 212 is described as receiving the communication signal, other implementations are possible. For example, the communications signal may be detected by the transducer 218.

Figure 3:
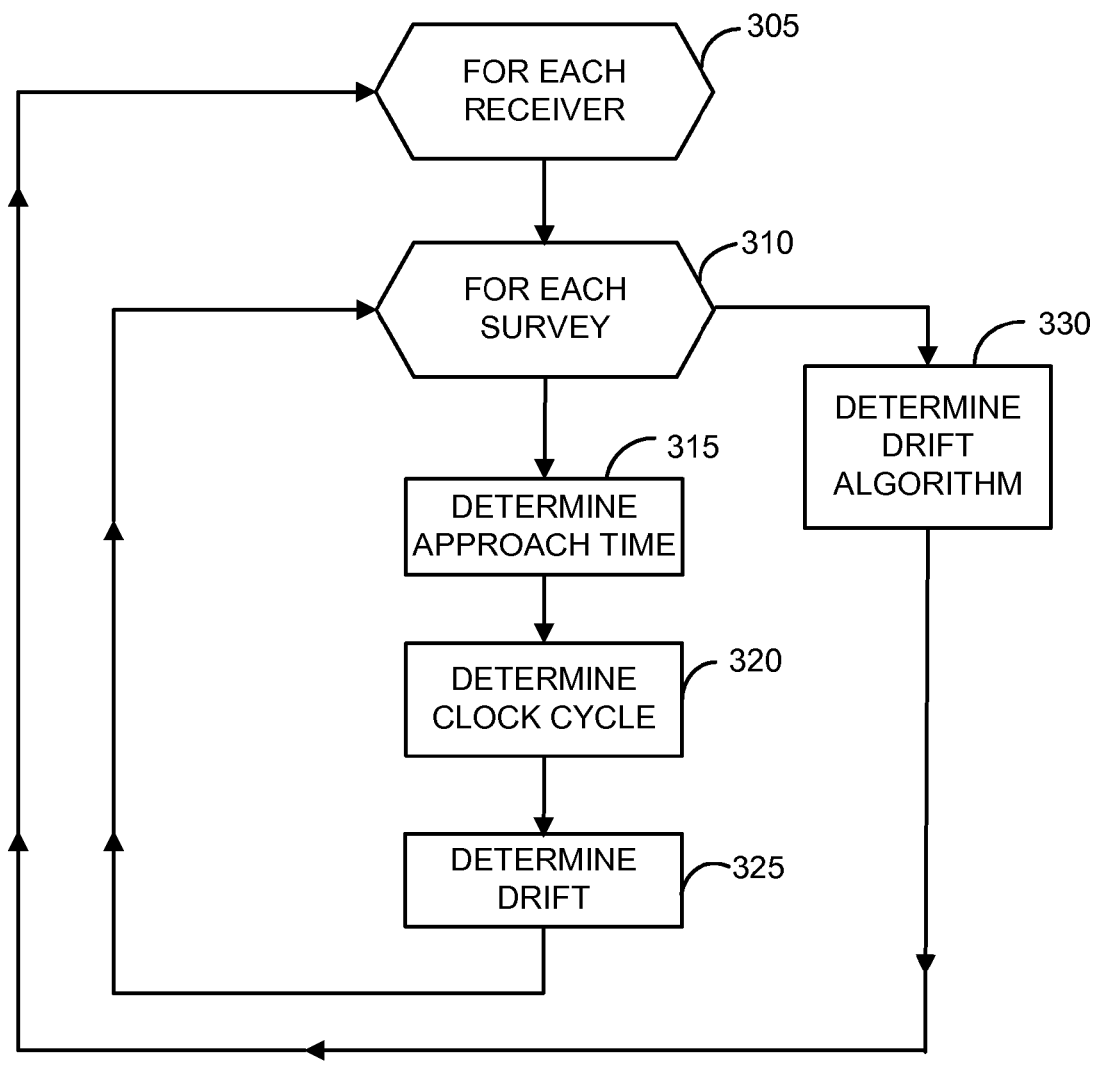
FIG. 3 illustrates a flow diagram for processing survey data in accordance with implementations of various technologies described herein.

FIG. 3 illustrates a flow diagram of a method 300 for processing survey data in accordance with implementations of various technologies described herein. The method 300 begins with a loop at step 305. Steps 310-330 are repeated for each receiver 110. At step 310, a loop begins to calculate the drift between each survey line. A survey line may be each occurrence whereby the source 104 passes over the receivers 110. In one implementation, after processing for all the survey lines is complete, the loop is repeated one final time to determine the drift between the last survey and the end time, which may be the time that the receiver 110 is recovered.

At step 315, the approach time may be determined. The approach time may be the time when the source 104 is closest to the receiver 110. It may be used as a consistent marking point for determining the amount of drift the clock 216 experiences between each survey line. Although the receiver 110 stores the time in the storage 214 at every clock cycle, the distance between the source 104 and the receiver 110 may result in a distortion of the actual time the survey and communication signals are received. Accordingly, to reduce the amount of distortion in calculating potential drift, only the time when the source 104 is closest to the receiver 110 may be stored for purposes of calculating the drift. This time may be referred to as the approach time. The source 104 may be closest to the receiver 110 when the source 104 is directly over the receiver 110.

At step 320, the clock cycle associated with the approach time may be determined. This clock cycle and the approach time associated therewith may then be used in determining the drift.

At step 325, the drift may be determined using the approach time, the clock cycle associated with the approach time, and the pre-programmed clock cycle rate. For example, the approach time recorded at the $1,000^{th}$ clock cycle may be determined to be 12:00:40 A.M. In this scenario, the drifted clock interval may be 25 cycles per second (1,000 cycles/40 seconds=25). Accordingly, the drift may be +5 cycles per second (25 cycles per second−20 cycles per second [pre-programmed clock cycle rate]).

At step 330, a drift algorithm may be determined based on the drift for each survey line. The drift algorithm may provide a way to approximate the actual time a measurement is recorded. The complexity of the drift algorithm may be based on the number of survey lines conducted. For example, in a scenario without any survey lines, it may be possible to determine the drift between the start time and end time, i.e., thereby resulting in a drift algorithm based on a linear equation. However, in a scenario with many survey lines, the drift algorithm may be based on a quadratic equation.

In one implementation, several drift algorithms may be determined for each receiver 110. For example, in a scenario where only one survey is conducted, a first linear equation may be determined based on the drift between the start time and the first survey line. Similarly, a second linear equation may be determined based on the drift between the first survey line and the end time. In a scenario with multiple survey lines, the drift algorithms may be based on multiple linear, or quadratic, equations. A single drift algorithm may reflect a trend in drift over the entire survey period, while multiple algorithms may reflect distinct drift behaviors over segments of the entire survey period. A survey period may be defined as the time between when a receiver is deployed and when a receiver is recovered. The survey period can be different for different receivers 110. In fact, the survey periods for different receivers 110 may overlap.

Figure 4:
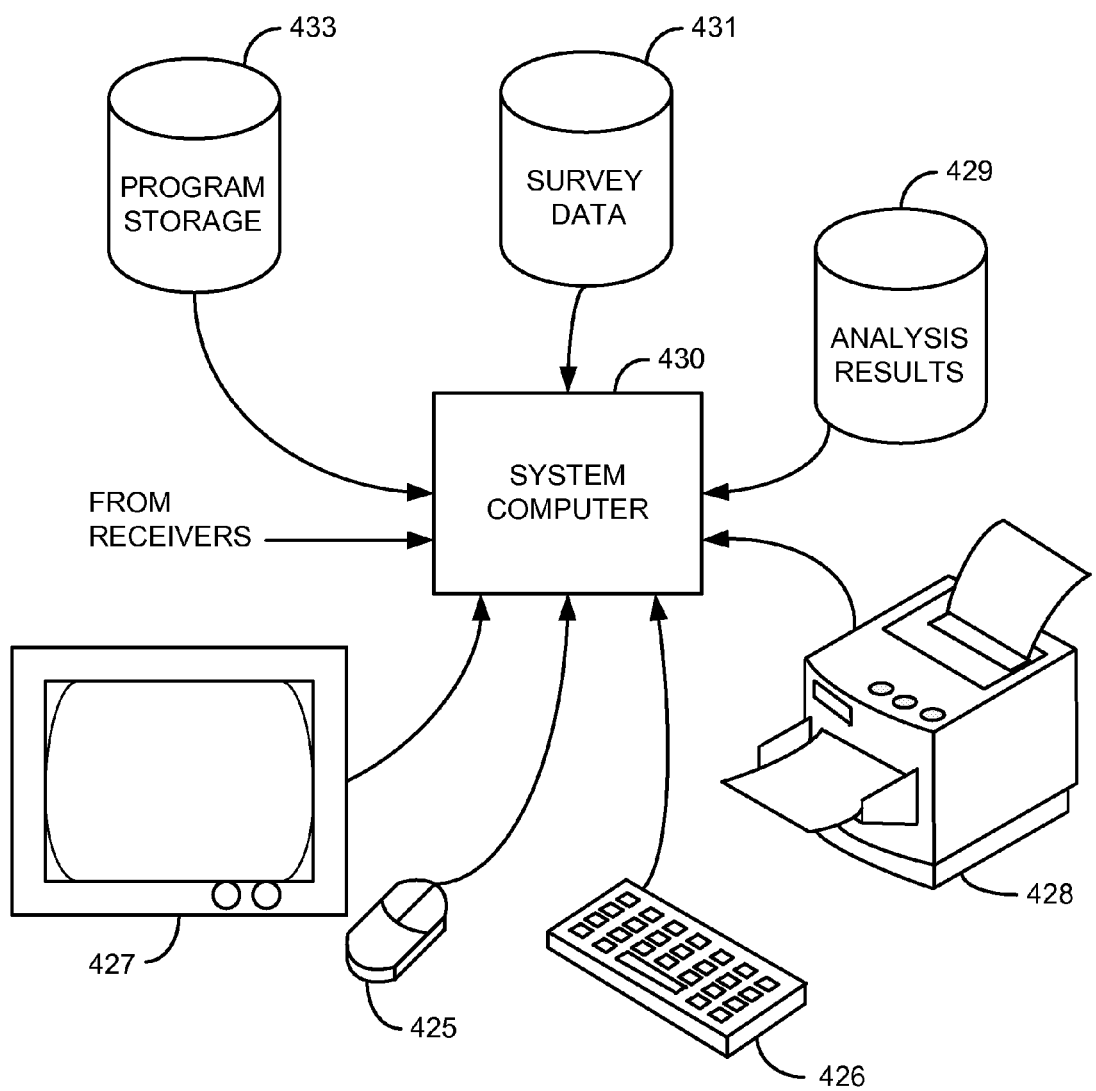
FIG. 4 illustrates a computer network, into which implementations of various technologies described herein may be implemented.

FIG. 4 illustrates a computer network 400, into which implementations of various technologies described herein may be implemented. The computer network 400 may include a system computer 430, which may be implemented as any conventional personal computer or server. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network PCs, minicomputers, mainframe computers, and the like.

The system computer 430 may be in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one implementation, signal data from the receivers 110 may be stored in disk storage device 431. The system computer 430 may retrieve the appropriate data from the disk storage device 431 to process signal data according to program instructions that correspond to implementations of various technologies described herein. The program instructions may be written in a computer programming language, such as C++, Java and the like. The program instructions may be stored in a computer-readable medium, such as program disk storage device 433. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 430. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 430 may present output primarily onto graphics display 427, or alternatively via printer 428. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

The system computer 430 may be located at a data center remote from the survey region. The system computer 430 may be in communication with the receivers (either directly or via a recording unit, not shown), to receive signals indicative of the detected survey signals. These signals, after conventional formatting and other initial processing may be stored by the system computer 430 as digital data in the disk storage 431 for subsequent retrieval and processing in the manner described above. While FIG. 4 illustrates the disk storage 431 as directly connected to the system computer 430, it is also contemplated that the disk storage device 431 may be accessible through a local area network or by remote access. Furthermore, while disk storage devices 429, 431 are illustrated as separate devices for storing input survey data and analysis results, the disk storage devices 429, 431 may be implemented within a single disk drive (either together with or separately from program disk storage device 433), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for communicating with a receiver to be used in an electromagnetic survey, comprising:
sending a survey signal to a subsurface region, wherein the survey signal is a first electromagnetic signal; and
sending a diagnostic signal to the receiver, wherein the diagnostic signal is a second electromagnetic signal having a diagnostic message.

2. The method of claim 1, wherein the survey signal is sent over a first frequency range from about 0.1 Hz to about 10 Hz and the diagnostic signal is sent over a second frequency range from about 10 Hz to about 100 Hz.

3. The method of claim 1, further comprising:
receiving a response signal from the receiver, wherein the response signal comprises a status of the receiver; and
storing the status.

4. The method of claim 3, wherein the status comprises an active status or an inactive status.

5. The method of claim 1, wherein the diagnostic message comprises a time that the survey signal is sent.

6. The method of claim 1, wherein the diagnostic message comprises a request for the receiver to indicate one or more data channels available for the electromagnetic survey.

7. The method of claim 6, further comprising receiving a response signal from the receiver, wherein the response signal comprises the one or more data channels available for the electromagnetic survey.

8. The method of claim 1, wherein the survey signal is sent through a first antenna and the diagnostic signal is sent through a second antenna different from the first antenna.

9. A method for communicating with a source to be used in an electromagnetic survey, comprising:
recording a measurement of an electromagnetic field strength radiating from a subsurface in response to a survey signal sent from the source; and
receiving a diagnostic signal from the source to be used in the electromagnetic survey, wherein the diagnostic signal is an electromagnetic signal having a diagnostic message.

10. The method of claim 9, further comprising sending a response signal to the source, wherein the response signal comprises a status of a receiver.

11. The method of claim 10, wherein the response signal further comprises a data channel of the receiver that is available for the electromagnetic survey.

12. The method of claim 9, wherein the diagnostic message comprises a time that the survey signal is sent from the source and further comprising:
associating the time with the electromagnetic field strength measurement; and
associating the time with a clock cycle of a receiver, wherein the clock cycle corresponds to a sequence of the electromagnetic field strength measurement.

13. A communication system for an electromagnetic survey, comprising:
a source configured to:
send a survey signal to a subsurface region; and
send a diagnostic signal to a receiver having a time that the survey signal is sent; and
the receiver configured to:
record a measurement of an electromagnetic field strength radiating from the subsurface region in response to the survey signal; and
receive the diagnostic signal.

14. The system of claim 13, further comprising a first antenna for transmitting the survey signal and a second antenna for transmitting the diagnostic signal, wherein the first antenna is distinct from the second antenna.

15. The system of claim 13, wherein the source is further configured to receive a response signal from the receiver, wherein the response signal comprises a status of the receiver.

16. The system of claim 13, wherein the diagnostic signal comprises a request for the receiver to indicate one or more data channels available for the electromagnetic survey.

17. The system of claim 13, wherein the source is further configured to receive a response signal from the receiver, wherein the response signal comprises one or more data channels available for the electromagnetic survey.

18. The system of claim 13, wherein the receiver is further configured to associate the time with the electromagnetic field strength measurement.

19. The system of claim 13, wherein the receiver is further configured to associate the time with a clock cycle of the receiver, wherein the clock cycle corresponds to a sequence of the electromagnetic field strength measurement.

20. The system of claim 13, wherein the survey signal and the diagnostic signal are electromagnetic signals.

21. The system of claim 13, wherein the time is a global positioning system (GPS) time.

22. A method for processing electromagnetic survey data, comprising:
determining an approach time when a source approaches a receiver;
determining a drift algorithm based on the approach time, a start time when the receiver is deployed, a first clock cycle associated with the start time, and a second clock cycle associated with the approach time; and
processing the electromagnetic survey data based on the drift algorithm.

23. The method of claim 22, wherein determining the drift algorithm is further based on an end time when the receiver is recovered and a third clock cycle associated with the end time.

24. A method for processing electromagnetic survey data, comprising:
 determining a first plurality of approach times when a source approaches a receiver during a first plurality of survey lines;
 determining a first drift algorithm based on:
  the first plurality of approach times; and
  a first plurality of survey clock cycles respectively associated with the first plurality of approach times;
 wherein the first drift algorithm reflects a first drift behavior during the first plurality of survey lines; and
 processing the electromagnetic survey data based on the first drift algorithm.

25. The method of claim 24, further comprising:
 determining a second plurality of approach times when the source approaches the receiver during a second plurality of survey lines;
 determining a second drift algorithm based on:
  the second plurality of approach times; and
  a second plurality of survey clock cycles respectively associated with the second plurality of approach times;
 wherein the second drift algorithm reflects a second drift behavior during the second plurality of survey lines; and
 processing the electromagnetic survey data based on the first drift algorithm and the second drift algorithm.

* * * * *